(12) United States Patent
Butzmann

(10) Patent No.: US 7,615,994 B2
(45) Date of Patent: Nov. 10, 2009

(54) MAGNETORESISTIVE SPEED SENSOR

(75) Inventor: Stefan Butzmann, Hagen (DE)

(73) Assignee: NXP B.V., Eindhoven (NL)

( * ) Notice: Subject to any disclaimer, the term of this patent is extended or adjusted under 35 U.S.C. 154(b) by 143 days.

(21) Appl. No.: 10/585,064

(22) PCT Filed: Dec. 20, 2004

(86) PCT No.: PCT/IB2004/052867

§ 371 (c)(1),
(2), (4) Date: Apr. 27, 2007

(87) PCT Pub. No.: WO2005/076016

PCT Pub. Date: Aug. 18, 2005

(65) Prior Publication Data

US 2008/0246465 A1    Oct. 9, 2008

(30) Foreign Application Priority Data

Jan. 8, 2004   (EP)   ................... 04100032

(51) Int. Cl.
*G01B 7/30*   (2006.01)
*G01R 33/09*  (2006.01)
*G01R 33/05*  (2006.01)

(52) U.S. Cl. ........................... 324/207.25; 324/207.21; 324/252

(58) Field of Classification Search ................. 324/174, 324/207.2, 207.21, 207.25, 251–252; 73/514.31, 73/514.39; 338/32 R, 32 H
See application file for complete search history.

(56) References Cited

U.S. PATENT DOCUMENTS

| 4,791,365 A | 12/1988 | Johannes et al. |
| 5,477,143 A | 12/1995 | Wu |
| 2002/0175673 A1* | 11/2002 | Butzmann .................... 324/174 |
| 2002/0175678 A1* | 11/2002 | Butzmann .............. 324/207.25 |

FOREIGN PATENT DOCUMENTS

| DE | 101 18 819 | 10/2002 |
| EP | 0 580 207 | 1/1994 |
| WO | WO 99/67651 | 12/1999 |

* cited by examiner

*Primary Examiner*—Bot L LeDynh

(57) ABSTRACT

Consistent with an example embodiment, there is a magnetoresistive speed sensor with a permanent magnet and a sensor for a magnetic field for detecting the speed of an object rotating about an x-axis. The magnetoresistive speed sensor is equipped with a measuring direction, in which an external magnetic interference field does not influence the measurement result. The measuring direction is aligned parallel with an x-direction and two sensors are disposed with displacement from one another and normal to the measuring direction.

17 Claims, 2 Drawing Sheets

MAGNETORESISTIVE SPEED SENSOR

The invention relates to a magnetoresistive speed sensor with a permanent magnet and with a sensor for a magnetic field for detecting the speed of an object rotating about an x-axis, wherein the magnetoresistive speed sensor is equipped with a measuring direction.

The person skilled in the art is aware of and familiar with magnetoresistive speed sensors in the most diverse embodiments from practical applications. They are used, in particular, in automotive engineering, to monitor the speed of a crankshaft or camshaft, or to monitor a rotation speed of a wheel about a wheel axis in ABS systems. Serving to detect the speed of the object is a toothed wheel, which is equipped on its outer periphery with teeth and tooth spaces, preferably distributed equidistantly, and which, on the rotation axis of the object to be scanned, rotates along with it. At least the teeth of the toothed wheel comprise a ferromagnetic material. The magnetoresistive speed sensor essentially comprises a permanent magnet, which generates a magnetic field. Disposed in this magnetic field is a sensor for the magnetic field. Generally used as the sensor is a Wheatstone bridge comprising four electrical resistors $R_i$ (i=1, 2, 3, 4), which is known per se.

The magnetic field of the permanent magnet is influenced in its direction by the movement of the rotating toothed wheel, or the teeth on its outer periphery, since the field lines of the magnetic field of the permanent magnet are drawn towards the ferromagnetic material of the teeth of the toothed wheel or quasi-repelled by the intervening tooth gaps. A rotation of the toothed wheel, and thereby of the object under investigation, thus results in a constant, periodically repeating change of the magnetic field at the location of the Wheatstone bridge.

Normally, the permanent magnet is aligned in such a way that the measuring direction of the magnetoresistive speed sensor, expressed in cartesian coordinates, points in a y-direction, whereas the object under investigation and the toothed wheel rotate about an x-axis. Accordingly, the teeth on the outer periphery of the toothed wheel also move essentially in a y-direction, i.e. parallel with the measuring direction, in the area of the magnetoresistive speed sensor.

In a known manner, the following equation can be cited for the magnetic field at the location of the four resistors $R_i$:

$$H_i = H_{Off} + H_{pk} * \sin(n*\Phi - n*y_i/r) + H_{ex} \quad (1)$$

wherein:
$H_i$=Magnetic field at resistor $R_i$
$H_{Off}$=Offset component of the magnetic field pattern
$H_{pk}$=Amplitude of the magnetic field pattern
n=Number of teeth on the toothed wheel
$\Phi$=Rotation angle of toothed wheel
r=Radius of toothed wheel
$y_i$=y-coordinate of resistor midpoint
$H_{ex}$=External magnetic field (interference field)

The so-called barberpole structure may be used for the four resistors $R_i$, so that $R_1$ and $R_3$ become greater ($\alpha_1, \alpha_3=+45°$) with a positive magnetic field and $R_2$ and $R_4$ become smaller with a positive magnetic field ($\alpha_2, \alpha_4=-45°$), wherein $\alpha$ is the direction of current flow through the MR resistor with a magnetic field strength of zero. We thus derive for the resistors:

$$R_1 = R_0 + S*(H_{Off} + H_{pk}*\sin(n*\Phi - n*y_1/r) + H_{ex}) \quad (2)$$

$$R_2 = R_0 - S*(H_{Off} + H_{pk}*\sin(n*\Phi - n*y_2/r) + H_{ex}) \quad (3)$$

$$R_3 = R_0 - S*(H_{Off} + H_{pk}*\sin(n*\Phi - n*y_3/r) + H_{ex}) \quad (4)$$

$$R_4 = R_0 + S*(H_{Off} + H_{pk}*\sin(n*\Phi - n*y_4/r) + H_{ex}) \quad (5)$$

wherein:
S=Resistance change in the resistance values $R_i$ as a function of the measurement field, i.e. the slope of the R-H characteristic of the sensor elements or the sensitivity of the sensor element i Using $y_i = y_2 = -y_3 = -y_4 = \Delta y$, the output signal of the Wheatstone bridge may be calculated in the following manner:

$$U_{out}/U_B = R_3/(R_1+R_3) - R_4/(R_2+R_4) \quad (6)$$

$$= -S*H_{pk}/R_0 * \sin(n*\Phi)\cos(n*\Delta y/r) - S*H_{ex} \quad (7)$$

wherein:
$U_B$=Supply voltage to measuring bridge
$U_{out}$=Output signal of measuring bridge It is apparent from equation (7) that an external magnetic field, or an interference field $H_{ex}$, directly influences the measurement result. In the automotive engineering field for example, an external interference field of this kind is the electromagnetic field generated by the starter during the starting operation of the engine. With sensors of this kind therefore, a speed cannot be measured, or can be measured only very imprecisely, especially in the case of changing magnetic interference fields.

Various methods of suppressing the external interference fields are known. For example, the Wheatstone bridge may be divided into two half bridges, wherein, viewed in the measuring direction, the two half bridges are disposed so as to be displaced from one another, as disclosed in DE-A 101 58 053. It should, however, be regarded as disadvantageous hereby that, given that the two half bridges are disposed in this manner, the measuring direction is also essentially aligned in parallel with the direction of movement of the teeth on the outer periphery of the toothed wheel. This means that, if disposed in the vicinity of the ferromagnetic toothed wheel in order to monitor the speed, then, depending on the position of the toothed wheel or of the ferromagnetic teeth, a sensor of this kind is operated in the magnetic saturation range. Owing to the harmonic waves or fields thereby arising, the differential signal of the two half bridges can no longer be evaluated without interference.

WO 99/67651 discloses a magnetic position sensor with a permanent magnet 2, the magnetic field of which is deflected by teeth or tooth gaps of a rotating toothed wheel 1, and the deflection is detected by a sensor 3. As is apparent from FIG. 1, the magnetic field is located normal to the rotation axis 4 of the toothed wheel 1, so comparative disadvantages occur here.

U.S. Pat. No. 4,791,365 describes a position sensor, the magnetic sensor of which can be moved relative to a magnetic flux concentrator of the magnetic field of a permanent magnet. This requires a high degree of design input and is not suitable, in particular, for use in automotive engineering.

U.S. Pat. No. 5,477,143 discloses a magnetoresistive proximity sensor with a permanent magnet 40 with an axis 42 of the magnetic field generated by it. The approach of an object 58 along the axis 42 is detected by magnetoresistive sensors 31 and 32.

It should be regarded as disadvantageous in the case of the known magnetoresistive speed sensors that, in this case, the measuring direction is, in the manner described above, essentially aligned parallel with the direction of movement of the ferromagnetic teeth of a toothed wheel, so that, in some circumstances, the precise detection of a speed is not possible. It is true that sensors are known that operate according to the Hall principle, wherein the measuring direction is essentially aligned normal to the direction of movement of the teeth. However, these exhibit only small output signals, which have to be amplified to an extreme degree. Moreover, they have a poor signal-to-noise ratio, making precise measurement with them impossible.

The present invention has been found useful in creating a magnetoresistive speed sensor that provides a precise measured value even in the presence of an external magnetic interference field.

The fundamental idea of the invention consists in the measuring direction of the magnetoresistive speed sensor being aligned to be normal to the direction of movement of the teeth of the toothed wheel, or the measuring direction and the direction of movement being orthogonal relative to each other. The measuring direction expressed in cartesian coordinates is hereby aligned to be parallel with the x-axis and thereby parallel with the axis of rotation of the toothed wheel and the object under investigation. Furthermore, two sensors are disposed in the area of the magnetic field of the permanent magnet, being displaced from one another normal to the measuring direction or x-axis. This means that the characteristic of the field lines of the permanent magnet is periodically varied by the movement of the ferromagnetic teeth of the toothed wheel. If a tooth is located in front of the sensors or the permanent magnet, the field lines are pressed or bent towards this tooth, and the magnetic field achieves its minimum in the x-direction. If a tooth gap is located in front of the sensors or the permanent magnet, the field lines of the permanent magnet are virtually uninfluenced and the magnetic field achieves its maximum in the x-direction. This variation in the magnetic field is detected by the two sensors permeated by the magnetic field, and a differential signal from the two sensors may be used to determine the speed of the toothed wheel and the object under investigation.

The advantage of the invention consists in the fact that, owing to the displaced disposal of two sensors in one direction normal to the measuring direction of the sensor and owing to the parallelism of the axis of rotation of the toothed wheel to the measuring direction, external magnetic interference fields do not influence the measurement results. Likewise, the measurements are not distorted by an operation of the sensors close to magnetic saturation.

The magnetic field prevailing at sensor j (j=A, B) may be approximated by the following equation:

$$H_j = H_{Off,x} - H_{pk,x} * \cos(n*\Phi - n*y_j/r) + H_{ex} \quad (8)$$

If we take as the basis the assumption that each of the two sensors delivers an output signal that is proportional to the magnetic field prevailing at the location of the sensor or to its components in the x-direction ($U_{out}/U_B = S_{Br} * H_x$), the differential signal of the two sensors may be calculated using the following equation:

$$(U_{out,A} - U_{out,B})/U_B = 2 * S_B * H_{pk,x} * \sin(n*\Phi) * \sin(n*y_j/r) \quad (9)$$

This equation no longer contains the external interference field, since it drops out mathematically with the formation of the differential signal of the two sensors.

Since the magnetic field of the permanent magnet varies both in the x-direction and in the y-direction during operation of the magnetoresistive speed sensor, i.e. when the toothed wheel with the ferromagnetic teeth rotates, no AMR sensors known to the person skilled in the art can be used to detect the changing magnetic field, since these require a constant magnetic field normal to the measuring direction, i.e. in the y-direction in this example, which is known as a magnetic booster field. Since, however, even a reversal of the magnetic field in the y-direction may occur as a result of the rotation of the toothed wheel, the so-called 'flip' effect may occur with these sensors, i.e. a reversal of the sensor characteristic. Preferably used for the magnetoresistive speed sensor are GMR sensors known from the prior art, which do not require a magnetic booster field as described above in order to detect the changing magnetic field.

In an example embodiment, a symmetrical design of the magnetoresistive speed sensors includes two sensors disposed symmetrically in relation to the x-axis on the y-axis. As a result, there is a symmetrical displacement of the two sensors from one another, i.e. both are displaced by an amount of +/−y along the y-axis from the x-axis running in the measuring direction, and in calculating the differential signal of the two sensors, independence from external interference fields is achieved, since these are then cancelled out.

In another example embodiment, a Wheatstone bridge as known from the prior art may be used for each of the two sensors. These deliver reliable measurement results and, for the person skilled in the art, their disposal in the magnetic field of the permanent magnet close to the rotating toothed wheel is possible with sufficient accuracy to guarantee a uniformly small air gap between the sensors and the teeth of the toothed wheel.

In another example embodiment, a half bridge is used as the sensor in each case, connected together in a manner known to the person skilled in the art. The differential signal of the two half bridges then delivers the differential signal described above, which is then, however, smaller by a factor of '2'. If this signal magnitude is sufficient for an evaluation, this embodiment offers the advantage of smaller sensors, since only two resistors are required for each sensor. The entire magnetoresistive speed sensor can therefore be made smaller.

The permanent magnet is preferably aligned in such a way that a component of the magnetic field already points in the x-direction without deflection by a ferromagnetic tooth. It is thereby achieved that a magnetic field of sufficient field strength is aligned on the rotating teeth of the toothed wheel and permeates two sensors displaced in relation to one another. This magnetic field is then varied by the movement of the teeth and the variation is measured with the sensors. The permanent magnet may be aligned in such a way that the main part of its magnetic field points in the z-direction in cartesian coordinates. The corresponding arrangement with a defined alignment relative to the axis of rotation of the toothed wheel and the object under investigation is possible for the person skilled in the art.

It goes without saying that the magnetoresistive speed sensor may be used to monitor speeds of any objects, such as shafts, spindles, wheels, in the most diverse areas of technology. Preferably, however, the speed sensor is used in automotive engineering, in particular to measure the speeds of crankshafts or camshafts. The speed sensor may also be used in ABS systems to monitor the rotation of a wheel during braking.

The invention will be further described with reference to examples of embodiments shown in the drawings to which, however, the invention is not restricted.

Figure 1:
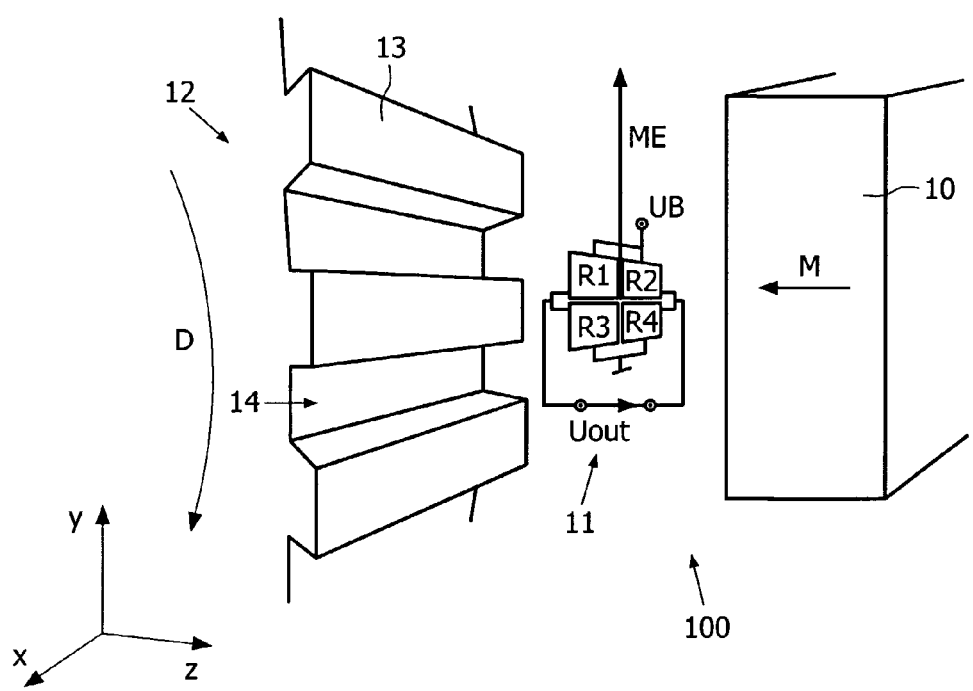
FIG. 1 shows a conventional speed sensor.

The magnetoresistive speed sensor 100 shown in FIG. 1 comprises a permanent magnet 10 whose magnetization M points in the z-direction of the cartesian coordinate system shown, and a Wheatstone bridge 11 with four resistors $R_i$ (i=1, 2, 3, 4) as the sensor for the magnetic field. A toothed wheel 12 is equipped, on its outer periphery, with equidistantly distributed teeth 13 and tooth gaps 14, wherein at least the teeth 13 comprise a ferromagnetic material. The toothed wheel 12 rotates about an axis which is aligned to be parallel with the x-direction, as indicated by the arrow D. The teeth 13 hereby rotate in the area of the magnetoresistive speed sensor 100, or in the area of the Wheatstone bridge 11, essentially in the y-direction from top to bottom.

Owing to the movement of the teeth 13, the magnetic field generated by the permanent magnet 10, which permeates the Wheatstone bridge 11, is periodically varied in a known manner, so that the Wheatstone bridge 11, which is operated with the supply voltage $U_B$, delivers an output signal $U_{out}$, from which a conclusion may be drawn as to the speed of the toothed wheel 12 and of the associated object. This measurement method is susceptible to external magnetic interference fields which may occur in motor vehicles, for example.

Figure 2:
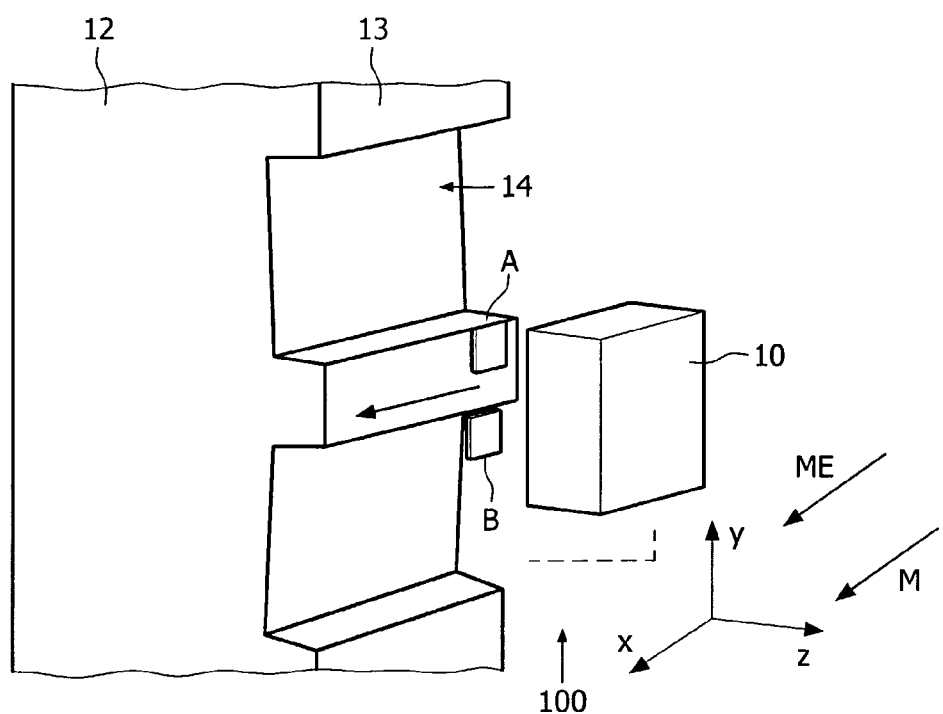
FIG. 2 shows a speed sensor in accordance with the invention.

In order to solve this problem, the magnetoresistive speed sensor 100 shown in FIG. 2 is equipped with two sensors A, B, which are disposed with displacement from one another in the y-direction and symmetrically in relation to the x-axis. The permanent magnet 10 is furthermore aligned in such a way that its magnetization M, or the magnetic field generated by it, exhibits at least one component pointing in the x-direction and permeating the two sensors A, B. The measuring direction ME of the magnetoresistive speed sensor 100 thereby points in the x-direction and is parallel with the axis of rotation of the toothed wheel 12. Owing to the movement of the teeth 13 of the toothed wheel 12, which takes place essentially from top to bottom in the y-direction in the area of the sensors A, B, the magnetic field of the permanent magnet 10 is also varied and this variation is detected by the sensors A, B. The differential signal thereby obtained is independent of external magnetic fields, so the magnetoresistive speed sensor 100 may, in particular, be used in automotive engineering.

LIST OF REFERENCE NUMBERS

100 Magnetoresistive speed sensor
10 Permanent magnet
11 Wheatstone bridge
12 Toothed wheel
13 Tooth
14 Tooth gap
A, B Sensor
ME Measuring direction
M Magnetization
$R_i$ Resistors of measuring bridge, i=1, 2, 3, 4
x,y,z Cartesian coordinates
$U_B$ Supply voltage to measuring bridge
$U_{out}$ Output signal from measuring bridge

The invention claimed is:

1. A magnetoresistive speed sensor a comprising a permanent magnet and a magnetic field detecting sensor for detecting the speed of an object rotating about an x-axis, wherein the magnetoresistive speed sensor has a measuring direction, characterized in that the measuring direction is aligned parallel with the x-direction, and two magnetic field detecting sensors are disposed on a y-axis essentially in the direction of the movement of the nearest portion of the object at a distance from one another and perpendicular to the measuring direction, wherein each of the two magnetic field detecting sensors generates an output signal.

2. A magnetoresistive speed sensor as claimed in claim 1, characterized in that the magnetic field detecting sensors are disposed symmetrically in relation to the x-axis on the y-axis.

3. A magnetoresistive speed sensor as claimed in claim 1, characterized in that each of the magnetic field detecting sensors is a Wheatstone bridge.

4. A magnetoresistive speed sensor as claimed in claim 1, characterized in that each of the magnetic field detecting sensors is a half bridge.

5. A magnetoresistive speed sensor as claimed in claim 1, characterized in that the permanent magnet has a magnetic field component in the x-direction.

6. A use of a magnetoresistive speed sensor as claimed in claim 1, in automotive engineering.

7. The use of a magnetoresistive speed sensor as recited in claim 6, wherein the automotive engineering includes at least one of the following: crankshaft speed monitoring, camshaft speed monitoring, or monitoring of an anti-lock braking (ABS) system.

8. A magnetoresistive speed sensor comprising a permanent magnet and a magnetic field detecting sensor for detecting the speed of an object rotating about an x-axis, wherein
the magnetoresistive speed sensor has a measuring direction, characterized in that the measuring direction is aligned parallel with the x-direction, and two magnetic field detecting sensors are disposed at a distance from one another symmetrically in relation to the x-axis on the y-axis and perpendicular to the measuring direction, wherein each of the two magnetic field detecting sensors generates an output signal.

9. The magnetoresistive speed sensor as recited in claim 8, wherein each of the magnetic field detecting sensors is a Wheatstone bridge.

10. The magnetoresistive speed sensor as recited in claim 8 wherein each of the magnetic field detecting sensors is a half bridge.

11. The magnetoresistive speed as recited in claim 8, wherein the permanent magnet has a magnetic field component in the x-direction.

12. The magnetoresistive speed as recited in claim 9, wherein the permanent magnet has a magnetic field component in the x-direction.

13. The magnetoresistive speed as recited in claim 10, wherein the permanent magnet has a magnetic field component in the x-direction.

14. A magnetoresistive speed sensor comprising,
a permanent magnet having a magnetic field component in the x-direction; and
a magnetic field detecting sensor for detecting the speed of an object rotating about an x-axis, the magnetic field detecting sensor being a Wheatstone bridge, wherein
the magnetoresistive speed sensor has a measuring direction, characterized in that the measuring direction is aligned parallel with the x-direction, and two magnetic field detecting sensors are disposed at a distance from one another symmetrically in relation to the x-axis on the y-axis and perpendicular to the measuring direction, wherein each of the two magnetic field detecting sensors generates an output signal.

15. The magnetoresistive speed sensor as claimed in claim 1, wherein the output signals from the two magnetic field detecting sensors comprise a first output signal from a first magnetic field detecting sensor and a second output signal from a second magnetic field detecting signal, and wherein the magnetoresistive speed sensor is further configured to calculate a differential signal of the first and second magnetic field detecting sensors based on the first and second output signals.

16. The magnetoresistive speed sensor as claimed in claim 8, wherein the output signals from the two magnetic field detecting sensors comprise a first output signal from a first magnetic field detecting sensor and a second output signal from a second magnetic field detecting signal, and wherein the magnetoresistive speed sensor is further configured to calculate a differential signal of the first and second magnetic field detecting sensors based on the first and second output signals.

17. The magnetoresistive speed sensor as claimed in claim 14, wherein the output signals from the two magnetic field detecting sensors comprise a first output signal from a first magnetic field detecting sensor and a second output signal from a second magnetic field detecting signal, and wherein the magnetoresistive speed sensor is further configured to calculate a differential signal of the first and second magnetic field detecting sensors based on the first and second output signals.

* * * * *